US012804127B2

(12) United States Patent
Tang

(10) Patent No.: US 12,804,127 B2
(45) Date of Patent: Nov. 17, 2026

(54) METHOD, SYSTEM AND PLATFORM FOR AUTONOMOUS FAULT DETECTION, IDENTIFICATION AND HEALING OF SMART VISION DEVICE

(71) Applicant: Lap Tak Tang, Hong Kong (CN)

(72) Inventor: Lap Tak Tang, Hong Kong (CN)

( * ) Notice: Subject to any disclaimer, the term of this patent is extended or adjusted under 35 U.S.C. 154(b) by 0 days.

(21) Appl. No.: 19/169,993

(22) Filed: Apr. 3, 2025

(65) Prior Publication Data

US 2025/0286990 A1 Sep. 11, 2025

(51) Int. Cl.
*H04N 17/00* (2006.01)
*G06F 11/07* (2006.01)
*H04N 23/617* (2023.01)

(52) U.S. Cl.
CPC ....... *H04N 17/002* (2013.01); *G06F 11/0736* (2013.01); *G06F 11/079* (2013.01); *G06F 11/0793* (2013.01); *H04N 23/617* (2023.01)

(58) Field of Classification Search
CPC ............... G06F 11/0736; G06F 11/079; G06F 11/0793; H04N 17/002; H04N 23/617
See application file for complete search history.

(56) References Cited

U.S. PATENT DOCUMENTS 7,450,757 B2 * 11/2008 Kato ......................... G06T 5/40 382/172
7,702,174 B2 * 4/2010 Kato .................... G06V 40/107 382/172
8,031,961 B2 * 10/2011 Nachlieli .................. G06T 5/73 382/254
8,121,193 B2 * 2/2012 Nakagomi ........... H04N 19/192 375/240.27
8,265,387 B2 * 9/2012 Monga ................. H04N 1/6069 358/518
8,811,757 B2 * 8/2014 Batur ..................... H04N 19/86 382/253
9,374,506 B2 * 6/2016 Biswas ..................... G06T 5/50
9,924,200 B2 * 3/2018 Spears ............. H04N 21/23439
2005/0232483 A1 * 10/2005 Kato ......................... G06T 5/94 382/190
2007/0019729 A1 * 1/2007 Nakagomi ........... H04N 19/176 375/E7.176
2007/0053588 A1 * 3/2007 Chen ...................... G06V 10/30 382/170

(Continued)

FOREIGN PATENT DOCUMENTS

CN 114584759 A 6/2022
CN 119210833 A 12/2024

*Primary Examiner* — Michael B. Pierorazio

(57) ABSTRACT

A method for autonomous fault detection, identification and healing of a smart vision device is provided. A first data corresponding to the smart vision device is generated and acquired in real time. The first data is operation status data of components of the smart vision device. The first data is processed through time-series analysis to generate a second data corresponding to the first data. The second data is abnormal data in the operation status data. A self-healing mechanism corresponding to the smart vision device is constructed. Based on the self-healing mechanism and a fault type of the second data, the smart vision device is autonomously healed in real time. A system and platform for implementing the method are also provided.

11 Claims, 19 Drawing Sheets

(56) References Cited

U.S. PATENT DOCUMENTS

| | | | | |
|---|---|---|---|---|
| 2007/0248166 | A1* | 10/2007 | Chen | H04N 19/44 375/E7.193 |
| 2007/0285511 | A1* | 12/2007 | Shafer | G08B 21/0476 340/541 |
| 2009/0021644 | A1* | 1/2009 | Peng | H04N 5/21 348/607 |
| 2009/0033773 | A1* | 2/2009 | Kinoshita | G06T 5/77 348/241 |
| 2009/0041351 | A1* | 2/2009 | Kato | G06T 5/94 382/171 |
| 2009/0290067 | A1* | 11/2009 | Ishiga | G06T 5/50 348/607 |
| 2010/0026896 | A1* | 2/2010 | Yamauchi | H04N 5/21 348/607 |
| 2010/0045870 | A1* | 2/2010 | Chao | H04N 5/21 348/607 |
| 2010/0091194 | A1* | 4/2010 | Lei | G06T 7/254 382/167 |
| 2010/0177936 | A1* | 7/2010 | Ebling | G06V 20/53 348/148 |
| 2010/0265402 | A1* | 10/2010 | Van Heesch | H04N 5/21 348/607 |
| 2010/0265404 | A1* | 10/2010 | McCarthy | H04N 5/213 348/E5.078 |
| 2010/0329361 | A1* | 12/2010 | Choi | H04N 19/176 375/E7.193 |
| 2011/0019093 | A1* | 1/2011 | Zhong | H04N 5/144 348/607 |
| 2011/0235941 | A1* | 9/2011 | Hamada | H04N 5/213 382/275 |
| 2011/0263209 | A1* | 10/2011 | Kasslin | H04B 17/345 455/67.11 |
| 2012/0019727 | A1* | 1/2012 | Zhai | H04N 5/145 348/E5.077 |
| 2012/0081612 | A1* | 4/2012 | Segall | H04N 5/213 348/607 |
| 2012/0114035 | A1* | 5/2012 | Nakagomi | H04N 19/11 375/240.03 |
| 2013/0177253 | A1* | 7/2013 | Batur | H04N 19/86 382/236 |
| 2014/0204996 | A1* | 7/2014 | Spears | H04N 21/84 375/240.02 |
| 2015/0267934 | A1* | 9/2015 | Park | F24F 11/77 700/300 |

* cited by examiner

METHOD, SYSTEM AND PLATFORM FOR AUTONOMOUS FAULT DETECTION, IDENTIFICATION AND HEALING OF SMART VISION DEVICE

TECHNICAL FIELD

This application relates to artificial intelligence vision devices, and more particularly to a method, system and platform for autonomous fault detection, identification and healing of a smart vision device.

BACKGROUND

The development of the Internet of Things and artificial intelligence technologies has led to the widespread application of smart vision devices (such as surveillance cameras and smart home cameras) in the fields of security, home automation and industrial detection. However, these devices often experience various faults during long-term operation, such as wireless fidelity (Wi-Fi) connection interruption, lens occlusion and hardware performance degradation. In the prior art, smart vision devices commonly lack efficient autonomous fault detection and healing capabilities, and rely more on manual intervention or simple restart operations, resulting in delayed fault response, high maintenance costs, and even loss of critical data.

In addition, smart vision devices are commonly composed of core components such as image sensors, processors, memory and communication modules. These components may experience signal anomalies due to various factors such as external impact during long-term operation. Once such anomalies occur, users often fail to proactively notice their occurrence. This not only affects the continuous and stable operation of the system, but may also pose safety risks.

Therefore, in view of the above technical problems of single fault detection, limited healing capability and low degree of intelligence, it is urgent to design and develop a method, system and platform for autonomous fault detection, identification and healing of smart vision devices.

SUMMARY

An object of the disclosure is to provide a method, system and platform for autonomous fault detection, identification and healing of a smart vision device, so as to overcome the deficiencies and difficulties in the prior art. In this way, the full automation of device abnormalities can be achieved by integrating multi-dimensional health monitoring, intelligent diagnosis and adaptive healing mechanisms, thereby significantly improving the reliability and stability of the device.

In order to achieve the above object, the following technical solutions are adopted.

In a first aspect, this application provides a method for autonomous fault detection, identification and healing of a smart vision device, comprising:

(1) generating and acquiring a first data corresponding to the smart vision device in real time, wherein the first data is operation status data of components of the smart vision device;

(2) processing the first data through time-series analysis to generate a second data corresponding to the first data, wherein the second data is abnormal data in the operation status data; and (3) constructing a self-healing mechanism corresponding to the smart vision device; and based on the self-healing mechanism and a fault type of the second data, autonomously healing the smart vision device in real time.

In some embodiments, the first data comprises hardware operating parameter data, communication status data and environmental index data corresponding to the smart vision device;

the components of the smart vision device comprise an image sensor, a processor, a memory and a power supply; and step (1) comprises:

separately generating and acquiring the hardware operating parameter data, the communication status data and the environmental index data, wherein the hardware operating parameter data comprises signal-to-noise ratio data of the image sensor, a wireless transmission operating status of the smart vision device, operation interaction information of the smart vision device, temperature data of the processor, load rate data of the processor, occupancy rate data of the memory, fragmentation degree data of the memory, a voltage fluctuation value of the power supply, a battery health level of the power supply and battery temperature data of the power supply.

In some embodiments, step (2) comprises:

(2.1) generating a third data corresponding to the first data based on data statistical analysis and data mining, wherein the third data is a change rate of key monitoring indicators related to operation status of the smart vision device in a preset monitoring period; and (2.2) generating and acquiring at least two sets of threshold data corresponding to the operation status data; and generating the second data according to the at least two sets of threshold data and the third data.

In some embodiments, the step (2) further comprises:

(2.3) generating and acquiring a fourth data corresponding to the smart vision device, wherein the fourth data is historical fault log data and healing result data corresponding to the historical fault log data;

(2.4) sequentially performing extraction and parsing on the fourth data to generate a fifth data corresponding to the fourth data, wherein the fifth data comprises time-domain feature data and frequency-domain feature data; and (2.5) based on the fifth data, constructing a fault feature database corresponding to the smart vision device.

In some embodiments, the step (2) further comprises:

(2.6) based on a machine learning algorithm, constructing a machine learning model corresponding to the second data, and continuously updating a weight of the machine learning model through online learning; and (2.7) based on the machine learning model in combination with the fault feature database, processing the second data by classified diagnosis to generate a sixth data corresponding to the second data, wherein the sixth data is fault type data of the smart vision device.

In some embodiments, step (3) comprises:

(3.1) based on the fault feature database, constructing a mapping relationship between the self-healing mechanism and the fault type of the second data; and (3.2) combined with the machine learning model, performing cluster analysis on the fault type data of the smart vision device, and optimizing a matching weight of the self-healing mechanism in real time;

wherein the self-healing mechanism comprises:

restarting a faulty module or restoring a latest available configuration;

switching a backup hardware link or downgrading an operation mode; and downloading and installing a healing patch or a complete firmware from a cloud.

In some embodiments, the method further comprises:

(4) after step (3), generating and acquiring a third data corresponding to the smart vision device, and transmitting the third data in real time;

wherein the third data comprises fault diagnosis result data and self-healing status data of the smart vision device.

In a second aspect, this application provides a system for implementing the above method, comprising:

a first data generation unit;

a first data processing unit; and a second data processing unit;

wherein the first data generation unit is configured to generate and acquire the first data in real time;

the first data processing unit is configured to process the first data through the time-series analysis to generate the second data; and the second data processing unit is configured to construct the self-healing mechanism and autonomously heal the smart vision device in real time based on the self-healing mechanism and the fault type of the second data.

In some embodiments, the first data generation unit comprises a first generation module; and the first generation module is configured to separately generate and acquire hardware operating parameter data, communication status data and environmental index data corresponding to the smart vision device;

the components of the smart vision device comprise an image sensor, a processor, a memory and a power supply; and the hardware operating parameter data comprises signal-to-noise ratio data of the image sensor, a wireless transmission operating status of the smart vision device, operation interaction information of the smart vision device, temperature data of the processor, load rate data of the processor, occupancy rate data of the memory, fragmentation degree data of the memory, a voltage fluctuation value of the power supply, a battery health level of the power supply and battery temperature data of the power supply.

In some embodiments, the first data processing unit comprises a second generation module and a third generation module;

the second generation module is configured to generate a third data corresponding to the first data based on data statistical analysis and data mining; and the third data is a change rate of key monitoring indicators related to operation status of the smart vision device in a preset monitoring period; and the third generation module is configured to generate and acquire at least two sets of threshold data corresponding to the operation status data, and generate the second data according to the at least two sets of threshold data and the third data.

In some embodiments, the first data processing unit further comprises a fourth generation module, a fifth generation module and a first construction module;

the fourth generation module is configured to generate and acquire a fourth data corresponding to the smart vision device; and the fourth data is historical fault log data and healing result data corresponding to the historical fault log data;

the fifth generation module is configured to sequentially parse and extract the fourth data to generate fifth data corresponding to the fourth data; and the fifth data comprises time-domain feature data and frequency-domain feature data; and the first construction module is configured to construct a fault feature database corresponding to the smart vision device based on the fifth data.

In some embodiments, the first data processing unit further comprises a second construction module and a first processing module;

the second construction module is configured to construct a machine learning model corresponding to the second data based on a machine learning algorithm, and continuously update a weight of the machine learning model through online learning; and the first processing module is configured to process the second data by classified diagnosis to generate a sixth data corresponding to the second data based on the machine learning model in combination with the fault feature database; and the sixth data is fault type data of the smart vision device.

In some embodiments, the second data processing unit comprises a third construction module and a second processing module;

the third construction module is configured to construct a mapping relationship between the self-healing mechanism and the fault type of the second data based on the fault feature database;

the second processing module is configured to perform cluster analysis on the fault type data of the smart vision device combined with the machine learning model, and optimize a matching weight of a self-healing mechanism in real time; and the self-healing mechanism comprises:

restarting a faulty module or restoring a latest available configuration;

switching a backup hardware link or downgrading an operation mode; and downloading and installing a healing patch or a complete firmware from a cloud.

In some embodiments, the system further comprises:

a second data generation unit;

wherein the second data generation unit is configured to generate and acquire a third data corresponding to the smart vision device, and transmit the third data in real time, wherein the third data comprises fault diagnosis result data and self-healing status data of the smart vision device.

In a third aspect, this application provides an electronic platform, comprising:

a processor;

a memory; and a control program;

wherein the memory is configured to store the control program; and the processor is configured to execute the control program to implement the above method.

Compared to the prior art, the present disclosure has the following beneficial effects.

The present disclosure provides the method for autonomous fault detection, identification and healing of a smart vision device. The first data corresponding to the smart vision device is generated and acquired in real time, where the first data is operation status data of components of the smart vision device; the first data is processed through time-series analysis to generate the second data corresponding to the first data, where the second data is abnormal data in the operation status data; the self-healing mechanism corresponding to the smart vision device is constructed; and based on the self-healing mechanism and the fault type of the second data, the smart vision device is autonomously healed in real time. The system and platform for implementing the method are also provided. The disclosure can monitor the operating status of the smart vision device in real time, comprehensively analyze the health data of the smart vision device and peripheral devices thereof. In addition, customized healing strategies are adopted for different types of faults or performance degradation, thereby enhancing the stability and reliability of the smart vision device, reducing maintenance costs, and ensuring the continuous and stable operation of the system.

In other words, the technical solution of the present disclosure can realize fully-automated processing of device anomalies by integrating multi-dimensional health monitoring, intelligent diagnosis and adaptive healing mechanisms, resulting in significantly improved reliability and stability of the device.

BRIEF DESCRIPTION OF THE DRAWINGS

In order to illustrate the technical solutions in the embodiments of the present disclosure or in the prior art more clearly, the drawings needed in the description of embodiments or the prior art will be briefly introduced below. Obviously, for those of ordinary skill in the art, other drawings can be obtained based on these drawings without exerting creative efforts.

DETAILED DESCRIPTION OF EMBODIMENTS

In order to make the purpose, technical solutions and advantages of the present disclosure clearer, the present disclosure will be further described in detail below in conjunction with the accompanying drawings and the embodiments. Those of ordinary skill in the art can easily understand other advantages and effects of the present disclosure from the contents disclosed in this specification.

Moreover, described below are merely some embodiments of the present disclosure, instead of all embodiments of the present disclosure. In addition to the embodiments described herein, any modifications, changes and replacements made by those skilled in the art without departing from the spirit of the disclosure shall fall within the scope of the disclosure defined by the appended claims.

It should be noted that all directional indications (such as up, down, left, right, front, back . . . ) in the description of the embodiments are merely intended to explain a relative positional relationship, movement, etc. between components in a specific posture (as shown in the accompanying drawings). When the specific posture changes, the directional indication changes accordingly.

In addition, relational terms such as "first" and "second" are only descriptive, and cannot be understood as indicating or implying relative importance or implicitly indicating the number of indicated technical features. Therefore, features defined as "first" and "second" can explicitly or implicitly include at least one of the features. Moreover, technical solutions in the embodiments can be combined with each other, but must be based on what can be achieved by those of ordinary skill in the art. When the combination of technical solutions appears to be contradictory or cannot be realized, it should be deemed that such combination of technical solutions does not exist and is not within the scope of the present disclosure defined by the appended claims.

A method for autonomous fault detection, identification and healing of a smart vision device is provided, which is applied to one or more terminals or servers. The terminal is a device that can automatically perform numerical calculation and/or information processing according to a pre-set or pre-stored instruction, whose hardware includes, but is not limited to, a microprocessor, an application specific integrated circuit (ASIC), a field-programmable gate array (FPGA), a digital signal processor (DSP) and an embedded device.

The terminal can be a computing device such as a desktop computer, a notebook, a personal digital assistant (PDA) and a cloud server. The terminal can interact with a user through a keyboard, a mouse, a remote control, a touchpad, a cloud backend interactive command, or a voice control device.

A system and platform for implementing the method are also provided.

Figure 1:
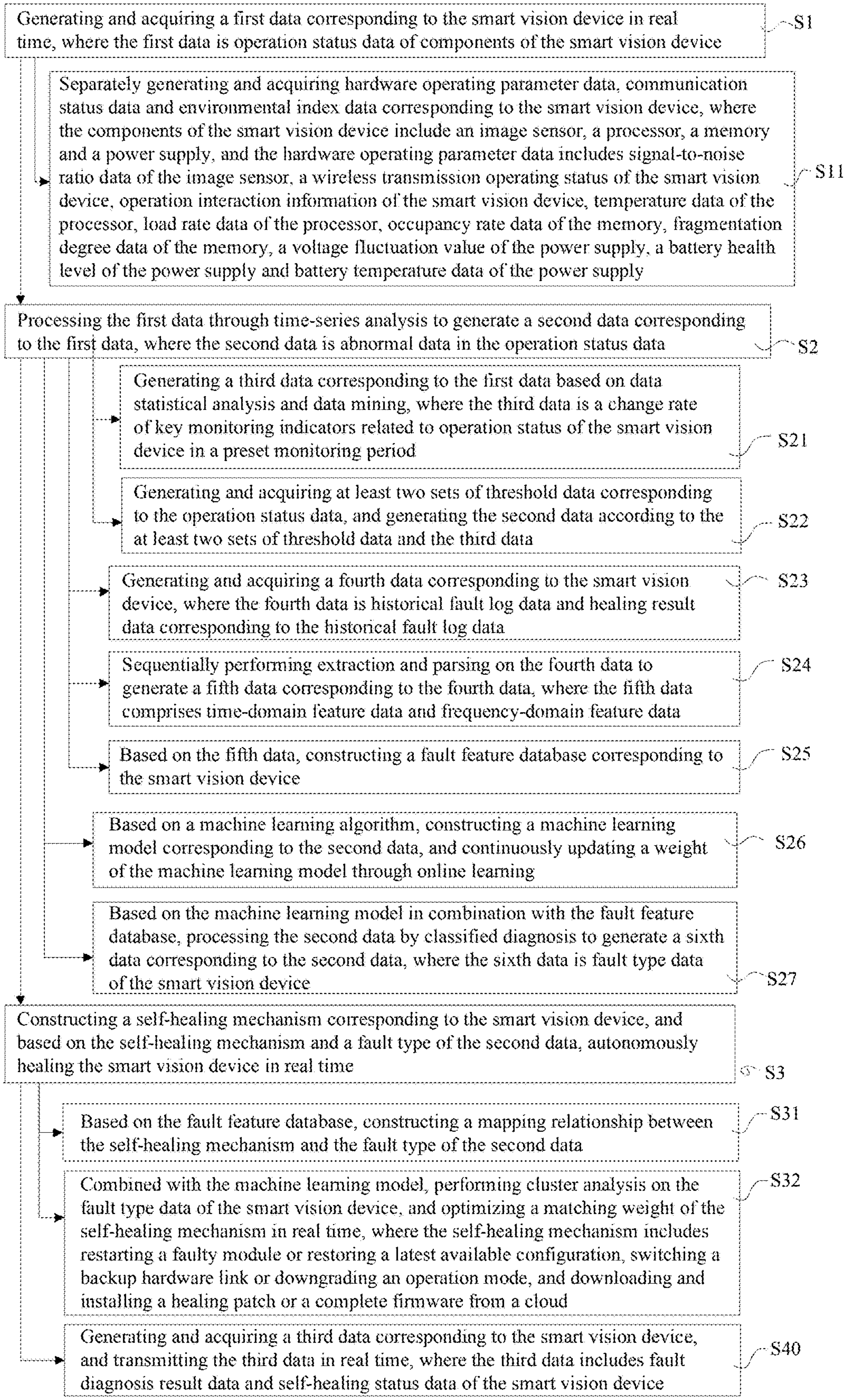
FIG. 1 is a flow chart of a method for autonomous fault detection, identification and healing of a smart vision device in accordance with an embodiment of the present disclosure.

FIG. 1 shows a flow chart of the method in accordance with an embodiment of the present disclosure.

In this embodiment, the method can be applied to a terminal with a display function or a fixed terminal. The terminal is, but not limited to, a personal computer, a smart phone, a tablet computer, a desktop computer or an all-in-one computer equipped with a camera.

The method can also be applied to a hardware environment consisting of a terminal and a server connected to the terminal through a network. The network includes, but is not limited to, a wide area network, a metropolitan area network or a local area network. The method can be implemented by a server, a terminal, or a combination thereof.

The disclosure will be further described below in conjunction with the accompanying drawings.

As shown in FIG. 1, the method includes the following steps.

(S1) A first data corresponding to the smart vision device is generated and acquired in real time. The first data is operation status data of components of the smart vision device.

(S2) The first data is processed through time-series analysis to generate a second data corresponding to the first data. The second data is abnormal data in the operation status data.

(S3) A self-healing mechanism corresponding to the smart vision device is constructed. Based on the self-healing mechanism and a fault type of the second data, the smart vision device is autonomously healed in real time. The first data includes hardware operating parameter data, communication status data and environmental index data corresponding to the smart vision device.

Step (S1) includes the following steps.

(S11) The hardware operating parameter data, the communication status data and the environmental index data are separately generated and acquired. The components of the smart vision device include an image sensor, a processor, a memory and a power supply. The hardware operating parameter data includes signal-to-noise ratio data of the image sensor, a wireless transmission operating status of the smart vision device, operation interaction information of the smart vision device, temperature data of the processor, load rate data of the processor, occupancy rate data of the memory, fragmentation degree data of the memory, a voltage fluctuation value of the power supply, a battery health level of the power supply and battery temperature data of the power supply.

Step (S2) includes the following steps.

(S21) A third data corresponding to the first data is generated based on data statistical analysis and data mining. The third data is a change rate of key monitoring indicators related to operation status of the smart vision device in a preset monitoring period.

(S22) At least two sets of threshold data corresponding to the operation status data are generated and acquired. The second data is generated according to the at least two sets of threshold data and the third data.

The step (S2) further includes the following steps.

(S23) A fourth data corresponding to the smart vision device is generated and acquired. The fourth data is historical fault log data and healing result data corresponding to the historical fault log data.

(S24) The fourth data is sequentially subjected to extraction and parsing to generate a fifth data corresponding to the fourth data. The fifth data includes time-domain feature data and frequency-domain feature data.

(S25) Based on the fifth data, a fault feature database corresponding to the smart vision device is constructed.

The step (S2) further includes the following steps.

(S26) A machine learning model corresponding to the second data is constructed based on a machine learning algorithm. A weight of the machine learning model is continuously updated through online learning.

(S27) Based on the machine learning model in combination with the fault feature database, the second data is processed by classified diagnosis to generate a sixth data corresponding to the second data. The sixth data is fault type data of the smart vision device.

Step (S3) includes the following steps.

(S31) A mapping relationship between the self-healing mechanism and the fault type of the second data is constructed based on the fault feature database.

(S32) Combined with the machine learning model, cluster analysis is performed on the fault type data of the smart vision device, and a matching weight of the self-healing mechanism is optimized in real time. The self-healing mechanism includes the following steps. A faulty module is switched, or a latest available configuration is restored. A backup hardware link is switched, or an operation mode is downgraded. A healing patch or a complete firmware is downloaded and installed from a cloud.

The method further includes the following step.

(S40) After step (S3), a sixth data corresponding to the smart vision device is generated and acquired, and is transmitted in real time. The sixth data includes fault diagnosis result data and self-healing status data of the smart vision device.

Specifically, in an embodiment, the method includes real-time acquisition of hardware operating parameters, communication status data and environmental indicators of the smart vision device; detection of operating anomalies through multi-level threshold comparison and time-series analysis; classified diagnosis of the operating anomalies based on a predefined fault feature library and a machine learning model; and selection of a matching solution from a preset healing strategy library to perform self-healing operation according to the diagnosis results.

The self-healing operation includes performing a hierarchical execution strategy, which is divided into primary healing, intermediate healing and advanced healing. The primary healing refers to restarting a faulty module or restoring a latest available configuration. The intermediate healing refers to switching a backup hardware link or downgrading an operation mode. The advanced healing refers to downloading and installing a healing patch or a complete firmware from a cloud.

The step of switching the backup hardware link is performed as follows. In a case where a main wireless fidelity (Wi-Fi) communication is interrupted, the following paths are tried in order of priority: Whether an alternative Wi-Fi network is available is determined; if yes, the smart vision device is connected to a 2.4-GHz or 5-GHz frequency band of another Wi-Fi network; if no, or the Wi-Fi network cannot be healed, a Wi-Fi hotspot of a gateway terminal and a cellular network are started, and the smart vision device is bridged to a gateway device for external network connection to achieve healing.

The method further includes healing effect verification, which is performed as follows. After performing the healing operation, a duration T of a fault indicator is re-monitored. If the fault indicator fails to return to a normal range, the healing strategy is upgraded or a request for manual intervention is sent to a management platform, where T is a preset duration related to the device type. Distributed healing is achieved through a device collaborative network. In a case where a local healing failure occurs, fault information is broadcast to a collaborative device group. An available resource provided by the collaborative device is received, including a network bandwidth, a computing power or a backup configuration file.

The method further includes performing a preventive maintenance mechanism, which is performed as follows. A health trend of the smart vision device is regularly analyzed, and a predictive maintenance operation is triggered before reaching a fault threshold. The health trend is modeled by means of data statistical analysis according to at least a utilization rate of a central processing unit (CPU) and the growth number of bad blocks in a memory.

The method is deployed in any one of a fully-localized execution architecture, an edge-cloud collaborative architecture and a blockchain evidence storage architecture. The fully-localized execution means that the entire process of detection-diagnosis-healing is completed independently by a built-in microcontroller of the smart vision device. The edge-cloud collaborative architecture means that fault detection and primary healing are performed at the edge end, and complex diagnosis relies on cloud computing power. The blockchain evidence storage architecture means that the fault event and healing record are written into the blockchain node for audit traceability.

In other words, the present disclosure proposes an intelligent monitoring system for a smart vision device and a self-healing technology thereof, which aims at addressing the limitations in existing smart vision devices where users fail to detect anomalies in a timely manner and rely on inefficient methods such as restarting to heal issues. The intelligent monitoring system integrates advanced fault detection, diagnosis and self-healing capabilities, which enables the system to autonomously identify and resolve various types of faults, and ensures continuous and stable operation of smart vision devices while significantly enhancing user experience and system maintenance efficiency.

In view of the fault detection mechanism, a highly integrated fault detection module is designed to perform real-time monitoring of the operating status of core components (such as an image sensor, a processor, a memory and a communication interface) of the smart vision device and timely warn of potential fault signs by analyzing device status logs or operating data.

The fault diagnosis mechanism works as follows. When an abnormality is detected, the intelligent monitoring system immediately starts a fault diagnosis process, the fault characteristics is accurately identified and classified through in-depth analysis of log data or device operating status data, the root cause of the fault is quickly located, and whether the fault originates from hardware failure, software error or other peripheral factors is determined.

The self-healing mechanism works as follows. The intelligent monitoring system automatically selects and executes the most suitable healing plan based on the diagnosis results. For software errors, the intelligent monitoring system will attempt to automatically restart a related service or application, restore default settings, or update to the latest version of the application. For hardware faults or issues affecting peripheral devices, the intelligent monitoring system will adjust operating parameters or operation modes to reduce the impact of the fault, and notify the user and the monitoring backend to take further actions when necessary.

Figure 2:
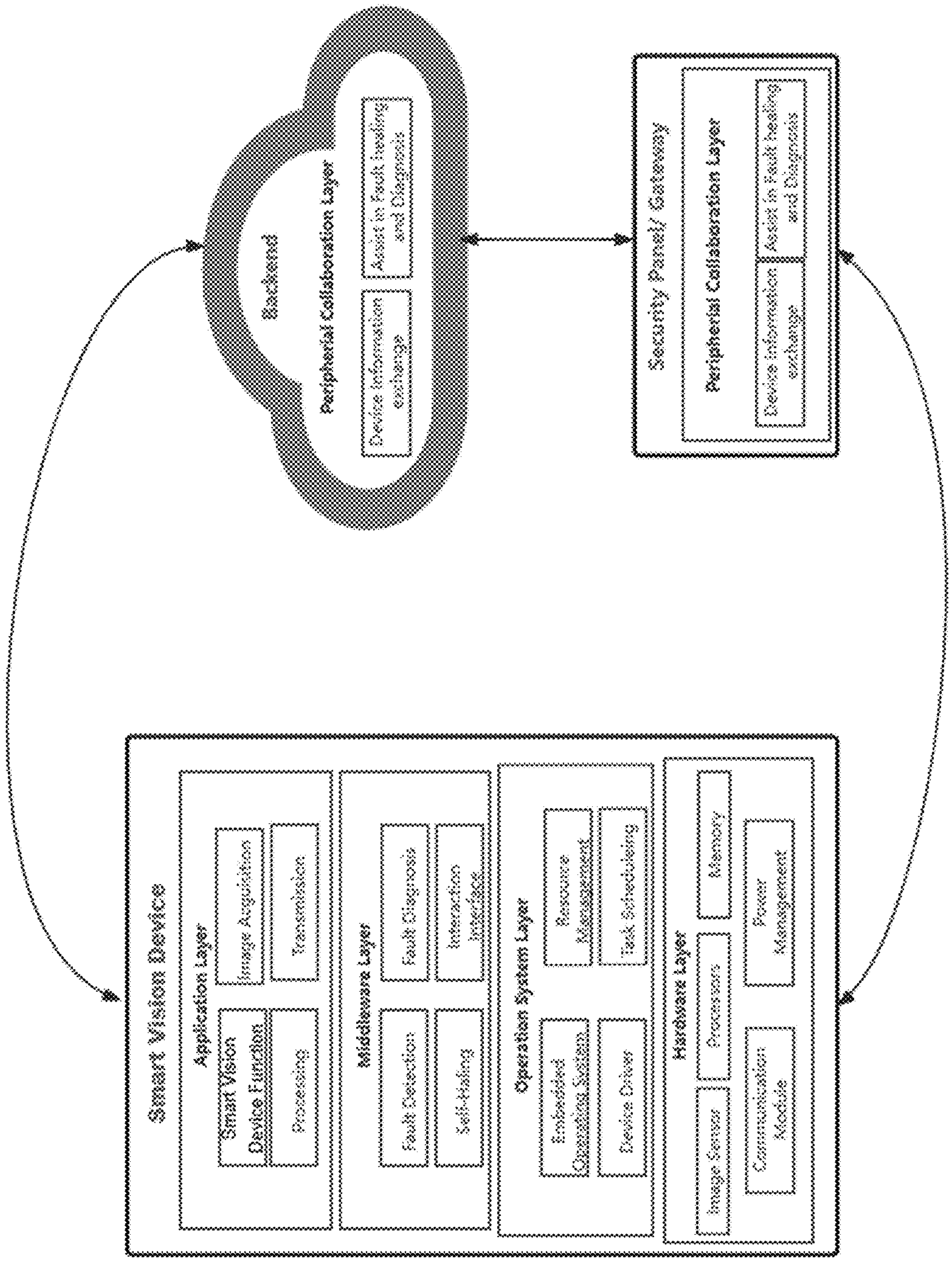
FIG. 2 is a block diagram of a self-healing system of the smart vision device in accordance with an embodiment of the present disclosure.

The intelligent monitoring system with a self-healing function proposed in the present disclosure is mainly composed of the core components as shown in FIG. 2, including a hardware layer, an operation system layer, a middleware layer, an application layer and a peripheral collaboration layer. The hardware layer includes an image sensor, a processor (CPU/graphics processing unit (GPU)/neural processing unit (NPU)), a memory (random access memory (RAM)/read-only memory (ROM)), a communication module (Wi-Fi/Bluetooth/sub-gigahertz radio frequency (SubG RF)) and a power management system. The operation system layer is configured to run a customized embedded operating system, and is responsible for resource management, task scheduling and device drivers. The middleware layer includes a fault detection execution engine, a fault diagnosis execution engine, a self-healing execution engine and a user interaction interface module. The application layer is configured to run main functional applications of the smart vision device, such as image acquisition, processing, storage and transmission. The peripheral collaboration layer includes a security panel and a cloud backend, which is configured to wirelessly exchange device information and logs, and assist in fault resolving and diagnosis.

Figure 3:
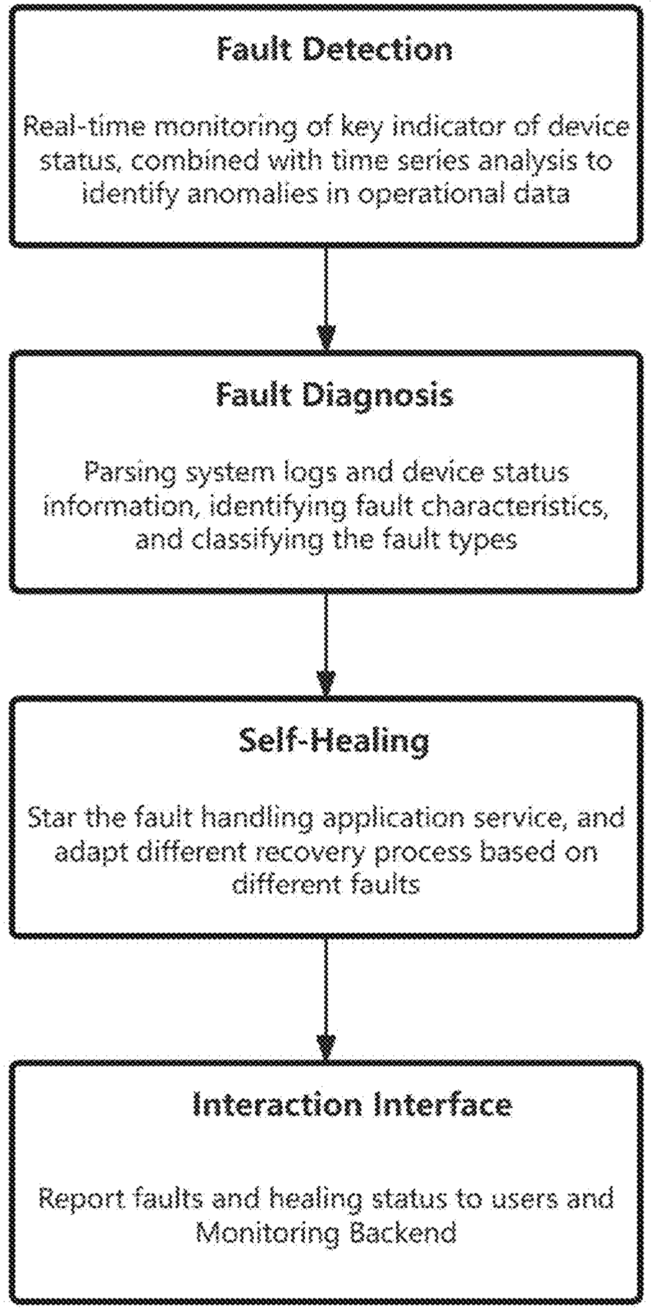
FIG. 3 is a flow chart of a fault detection and device self-healing process in accordance with an embodiment of the present disclosure.

An intelligent monitoring system with a self-healing function is provided, in which the middleware layer application mainly serves for fault detection and device self-healing. FIG. 3 shows the fault detection and device self-healing process, including fault detection, fault diagnosis, self-healing and interaction.

The fault detection refers to real-time monitoring of key indicators of device status (such as image anomaly, CPU temperature, memory usage, and wireless radio frequency efficiency of Wi-Fi), and identification of operating data anomalies in combination with the time-series analysis. The fault diagnosis is performed through parsing system logs and device status information, identifying and classifying fault features, and initiating a healing request after determining the cause of the fault. The self-healing mechanism enables the startup of the fault handling application service and differentiated recovery processes to be adapted according to different faults. The fault and healing status thereof are reported to the user and the monitoring backend through the interactive interface.

Figure 4:
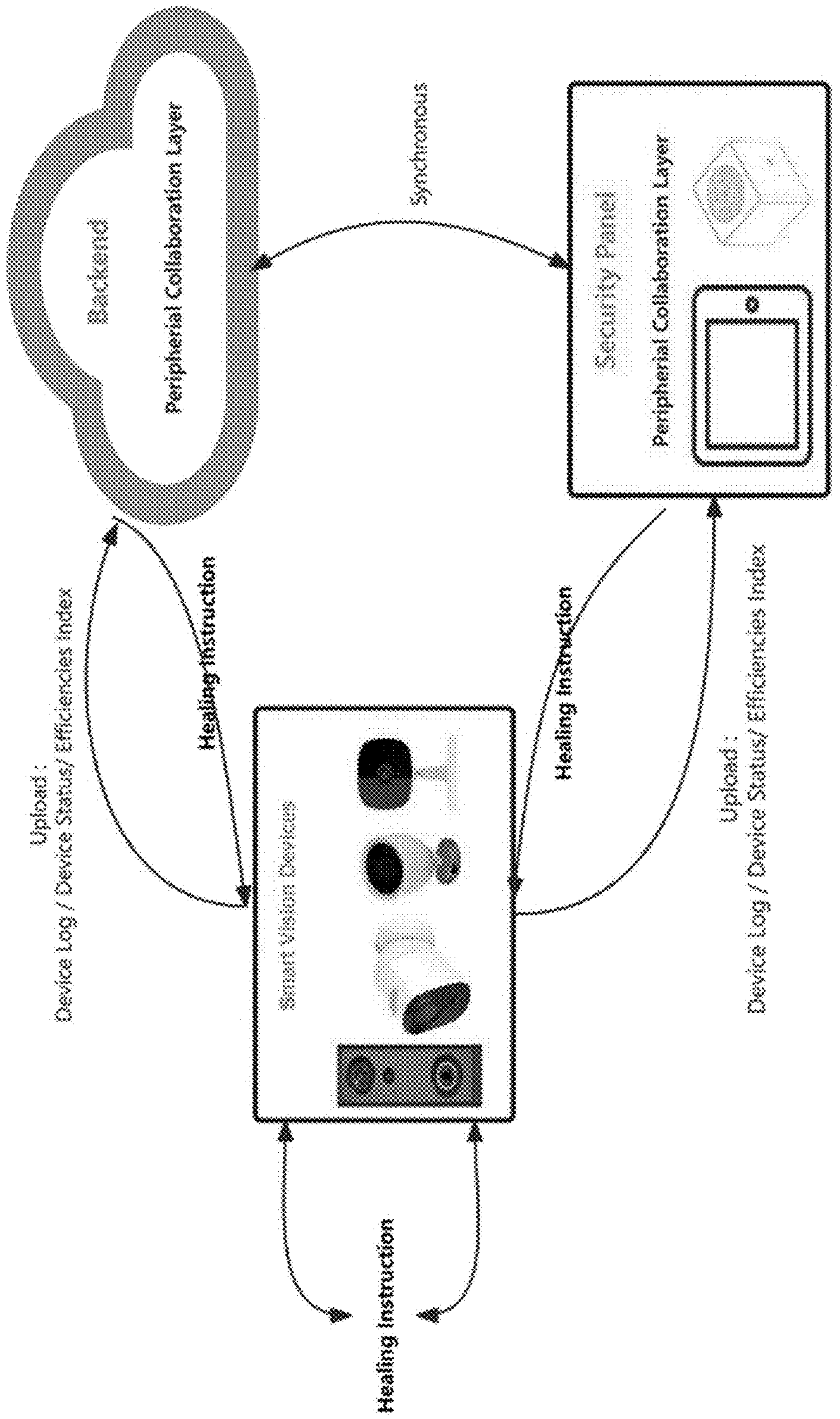
FIG. 4 is a flow chart of an operation process of a peripheral collaboration layer in accordance with an embodiment of the present disclosure.
Figure 5A:
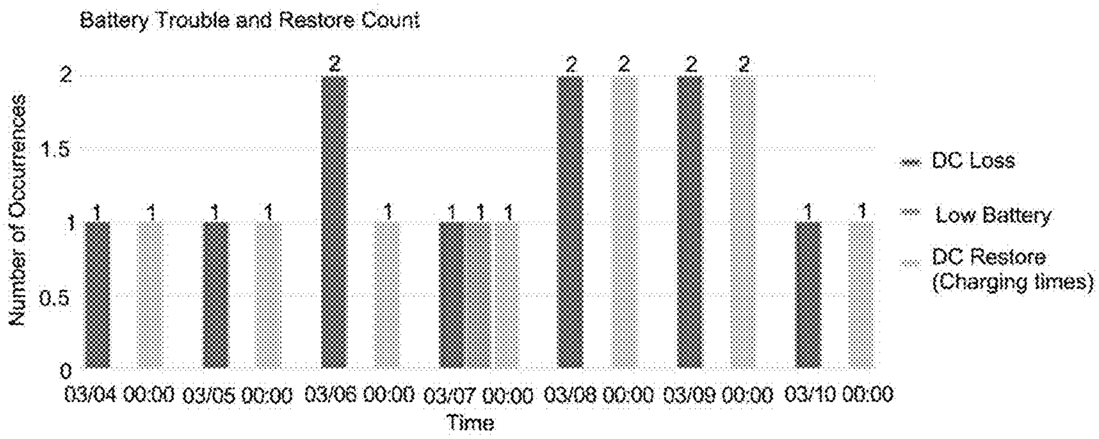
FIGS. 5*a-e* show key monitoring indicators related to operation status of the smart vision device displayed on a dashboard of a cloud backend in accordance with an embodiment of the present disclosure.
Figure 5B:
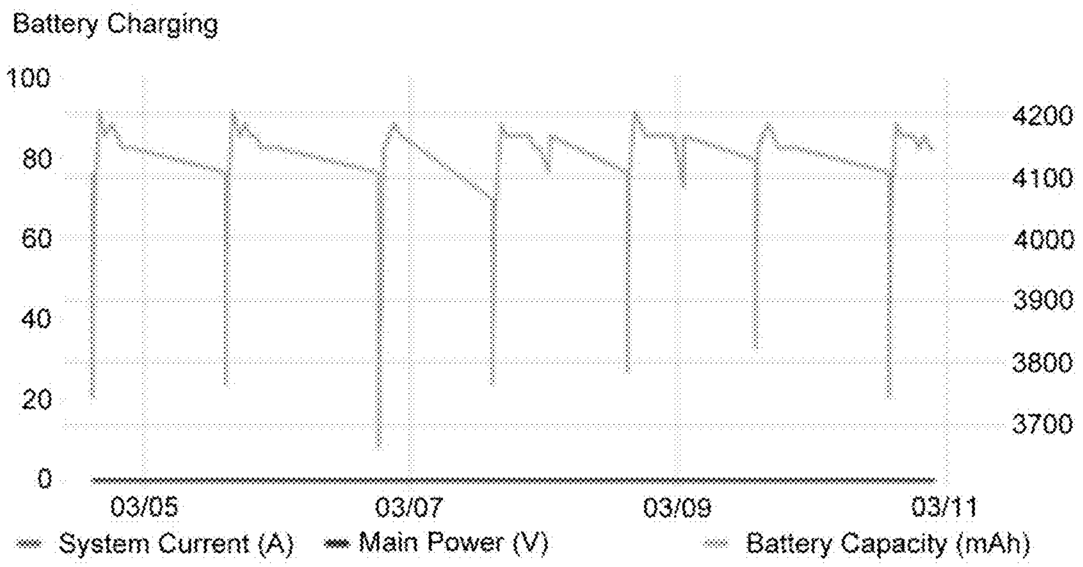
Figure 5C:
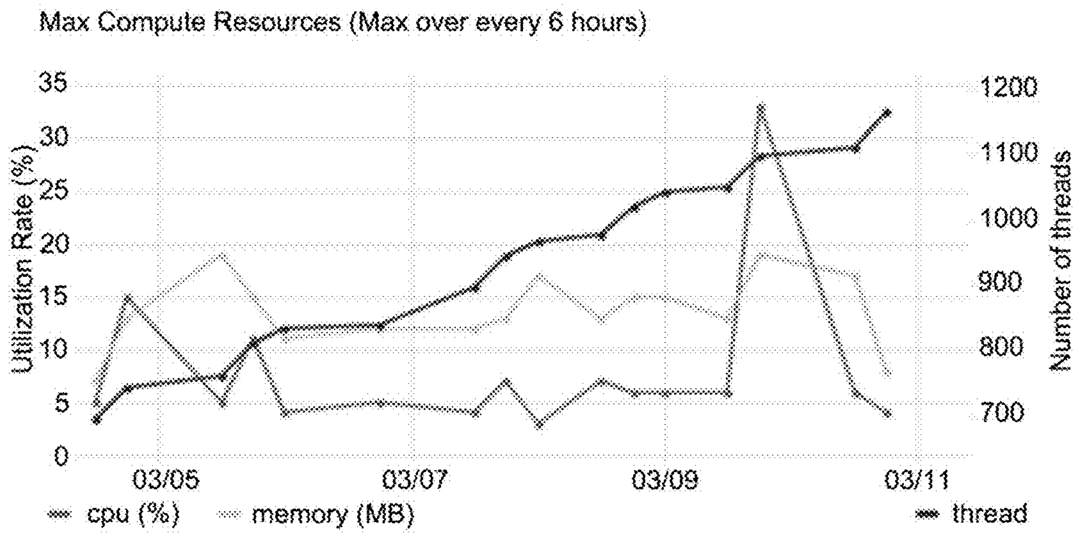
Figure 5D:
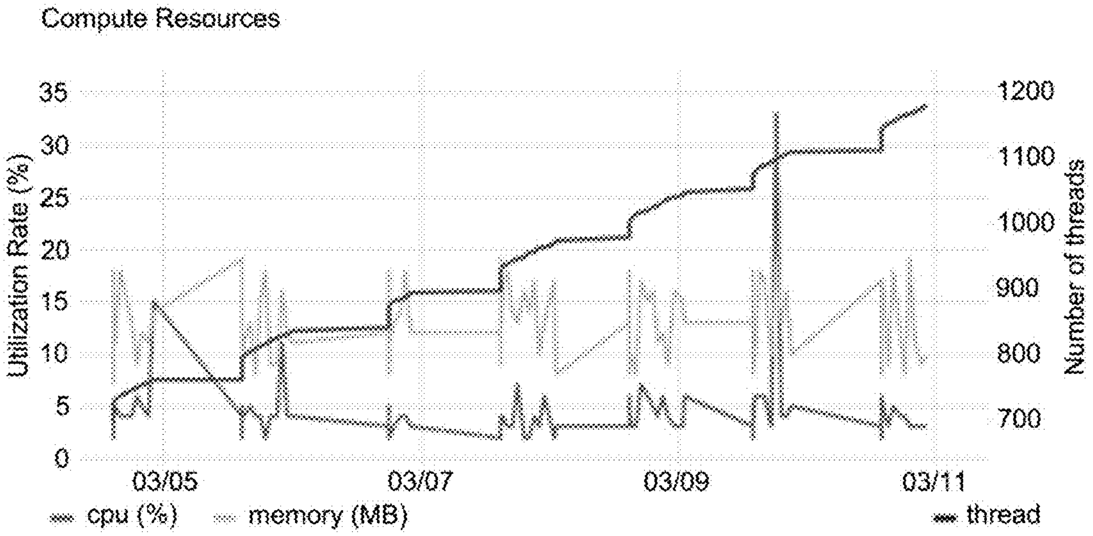
Figure 5E:
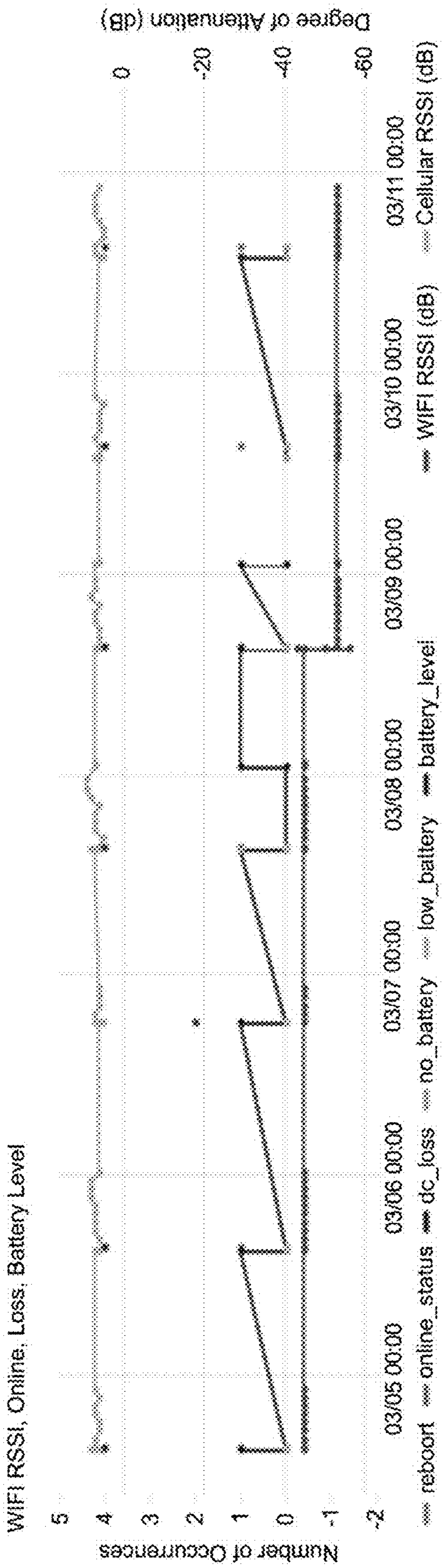

As the peripheral collaboration layer of the self-healing mechanism, the backend and security panel collect and analyze the health status of the smart vision device through the real-time operation status information and logs uploaded by the smart vision device, automatically trigger the corresponding healing process and monitor the whole process when a potential fault is found. FIG. 4 shows the operation process of the peripheral collaboration layer.

Real-time operation status information and logs are uploaded by the smart vision device, and key monitoring indicators are displayed on the dashboard. The backend adopts a statistical analysis method and a comparative analysis method to deeply analyze the evaluation data, and actively triggers the corresponding healing process when the potential fault is found. FIGS. 5*a-e* show key monitoring indicators related to operation status of the smart vision device displayed on a dashboard of a cloud backend.

Figure 6:
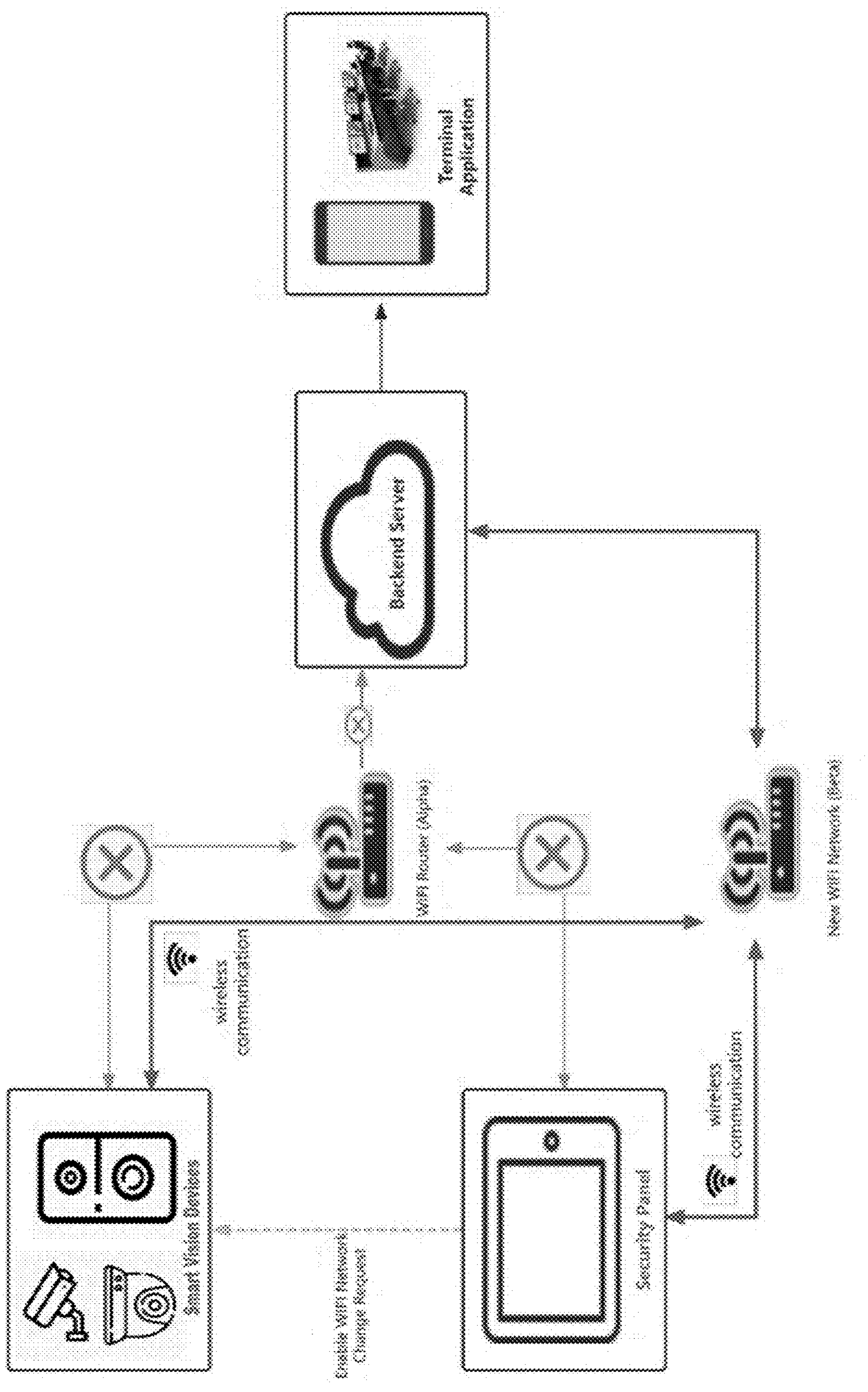
FIG. 6 schematically shows a framework of a self-healing mechanism when a home wireless fidelity (Wi-Fi) is disconnected and a backup Wi-Fi is available in accordance with an embodiment of the present disclosure.
Figure 7:
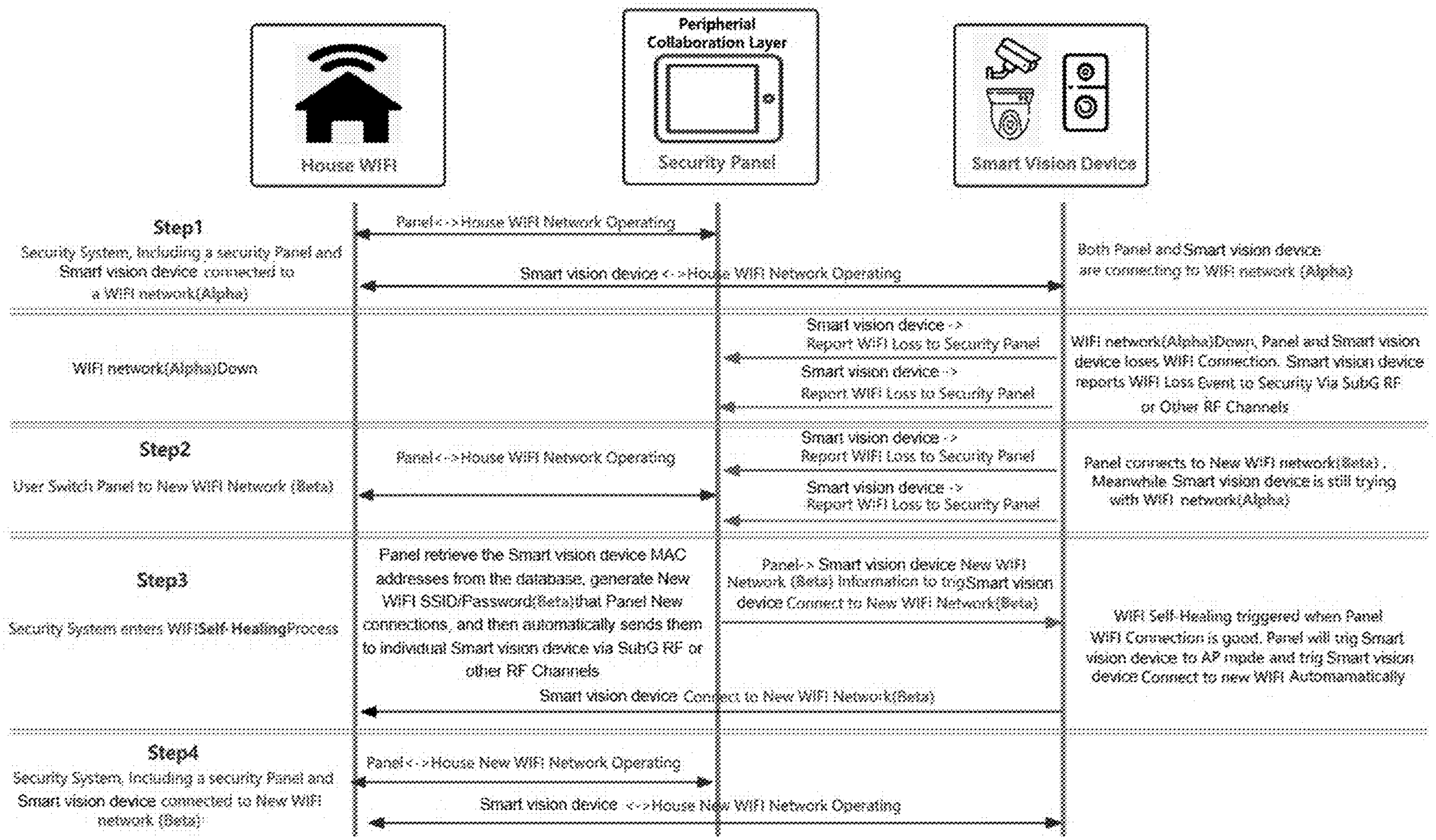
FIG. 7 is a flow chart of performing self-healing mechanism when the home Wi-Fi is disconnected and the backup Wi-Fi is available in accordance with an embodiment of the present disclosure.

In Internet of Things (IoT) applications, the Wi-Fi network is an important communication bridge that connect the smart vision device to the IoT system. However, when a Wi-Fi network failure occurs, the smart vision device will not be able to work properly, which affects the monitoring and data transmission of the entire system. In view of this, the present disclosure proposes an innovative self-healing solution, that is, when a Wi-Fi network interruption is detected, the smart vision device can automatically detect the fault, self-heal the disconnected network link and re-establish a new network connection to ensure the continuous and stable operation of the system. This technical solution is not only applicable to smart vision devices, but also can be applied to any IoT products that communicate via Wi-Fi. FIG. 6 shows the framework of a self-healing mechanism when a home Wi-Fi is disconnected and a backup Wi-Fi is available. FIG. 7 shows a process of performing self-healing mechanism when the home Wi-Fi is disconnected and the backup Wi-Fi is available.

Figure 8:
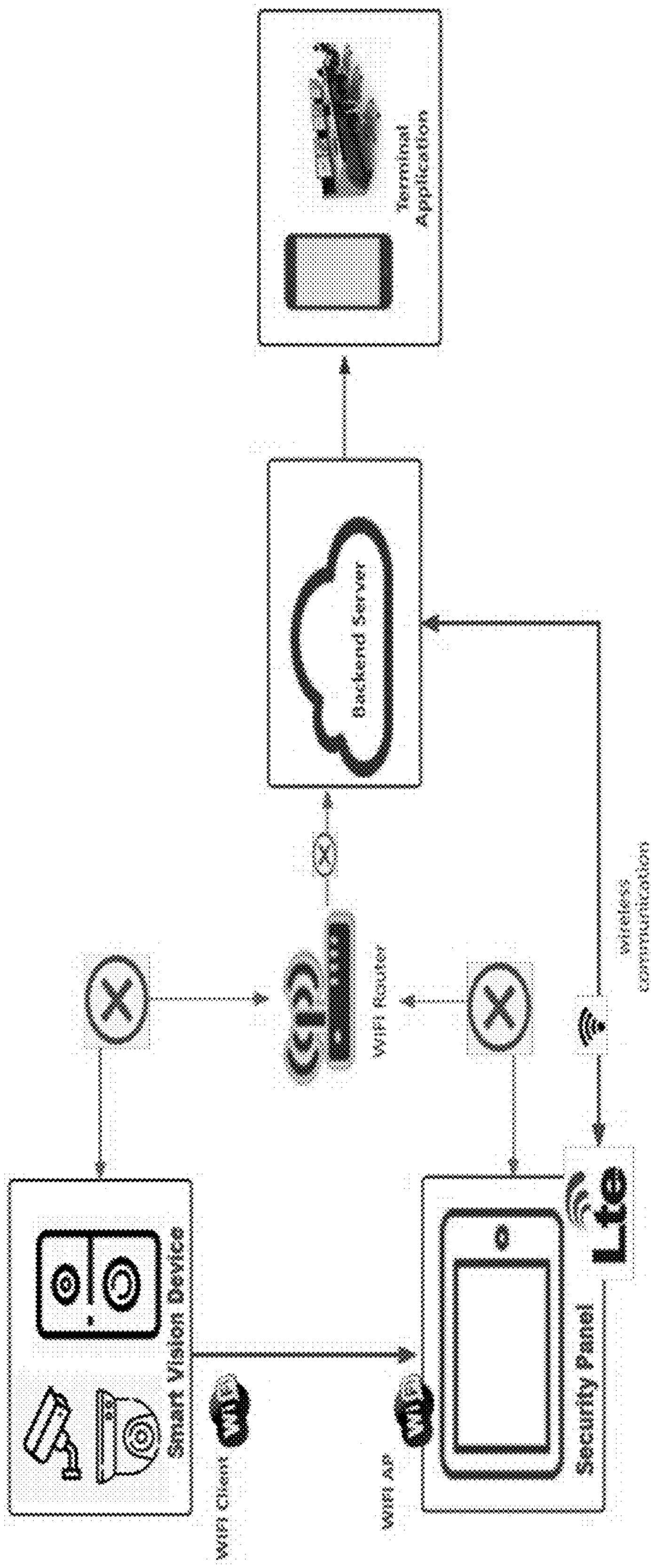
FIG. 8 schematically shows a framework in which a gateway automatically activates a Wi-Fi hotspot as a backup network when the home Wi-Fi is disconnected and no backup Wi-Fi is available in accordance with an embodiment of the present disclosure.
Figure 9:
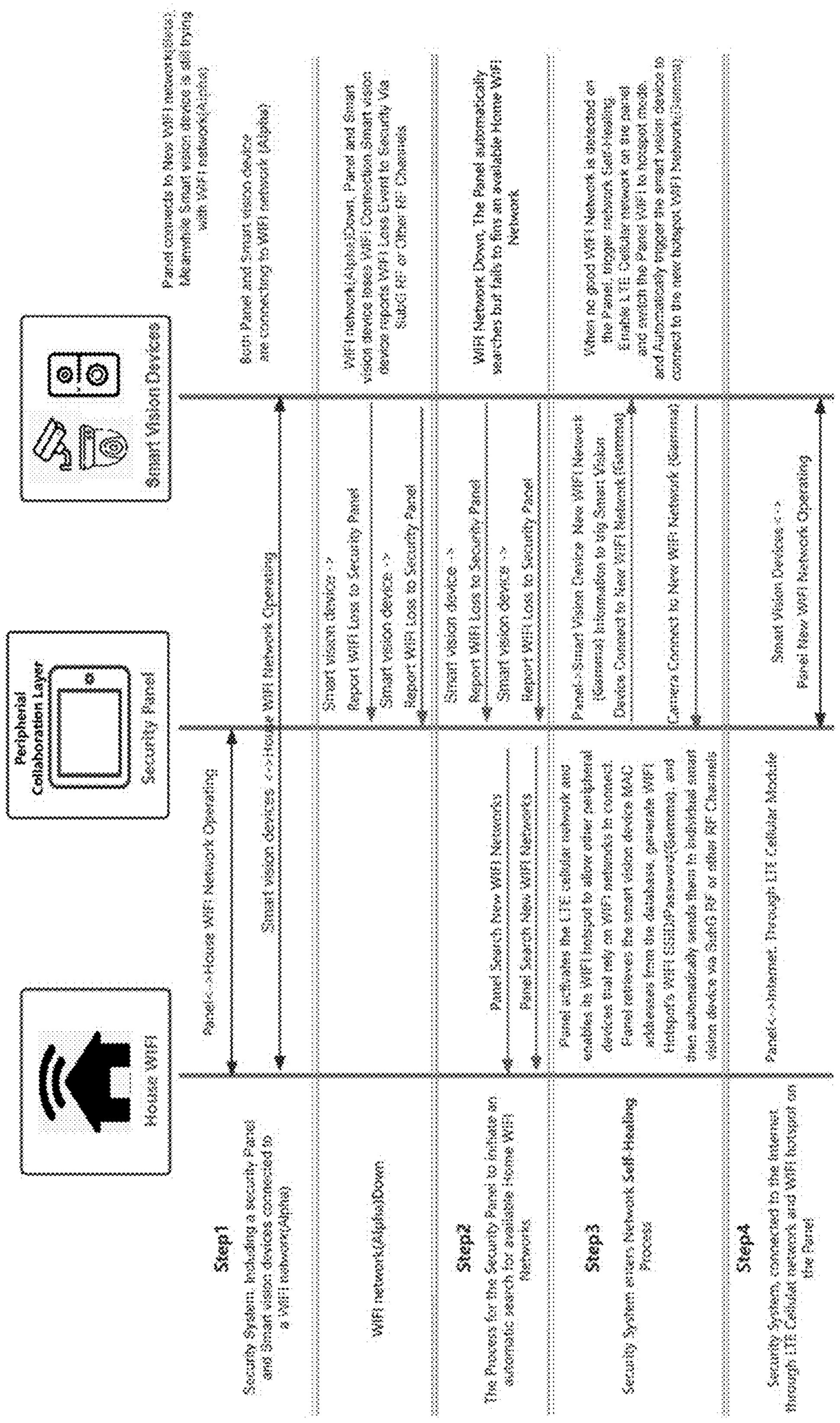
FIG. 9 is a flow chart of the gateway automatically activating the Wi-Fi hotspot as the backup network when the home Wi-Fi is disconnected and no backup Wi-Fi is available in accordance with an embodiment of the present disclosure.

In a case where the Wi-Fi router network is interrupted and no alternative router is available, in order to ensure the continuous and stable operation of the system, the security panel automatically activates the built-in Wi-Fi hotspot as a backup network, and adopts a long-term evolution (LTE) cellular network to maintain communication with the Internet. FIG. 8 shows the framework for this scenario. FIG. 9 shows the corresponding self-healing strategy process.

As shown in FIGS. 10-13, in a case where the smart vision device crashes due to an abnormal situation, the intelligent monitoring system immediately activates a watchdog mechanism to start the self-healing process, that is, the smart vision device automatically performs a reset operation and functionality restoration, and transmits the event log to the backend for analysis after reconnection. If the analysis results show that the crash problem has been fixed in the subsequent version, the backend will automatically initiate a version update request to the smart vision device. By virtue of this self-healing process, accurate adaptive management and efficient self-healing mechanism of the smart vision device are realized.

The backend system can continuously monitor the key indicators and log information of the device status, and adopts an intelligent method to analyze the performance of the smart vision device. In a case where a potential problem that may affect the function is detected, such as abnormal CPU load, memory fragmentation, and performance degradation of the communication module (including, but not limited to, Wi-Fi, Bluetooth and SubG RF), the problem is automatically classified, and a restart request is accordingly initiated to the smart vision device, so as to realize accurate adaptive management and an efficient self-healing mechanism.

In an embodiment, an intelligent monitoring system with a self-healing function is provided, including a smart vision device module, a processor module, a self-healing module, a communication module and a peripheral collaboration mechanism. The smart vision device module is configured to collect image data and provide visual input for the system. The processor module is configured to analyze performance information of key components of the smart vision device, and detect internal faults of the system. The self-healing module is configured to perform a self-healing mechanism, which integrates fault detection, fault diagnosis and self-healing functions. The processor module is configured to automatically trigger at least one self-healing operation when identifying a system fault, where the at least one self-healing operation includes software restart, hardware reset, or collaborative healing process in conjunction with other devices. The communication module is configured to establish communication with an external server when necessary to acquire an additional healing instruction or resource, thereby enhancing the self-healing capability of the system. The peripheral collaboration module is configured to perform a peripheral collaboration mechanism, which integrates with peripherals such as a panel, a backend system and other peripheral systems to assist the smart vision device in performing self-healing operation by exchanging status information of the smart vision device when a fault occurs.

By virtue of the above framework, the intelligent monitoring system adopts integration of the diagnostic algorithm and healing logic to achieve comprehensive self-healing without human intervention. In addition, the intelligent monitoring system is also provided with key components such as an image sensor, one or more processors, one or more memories, one or more wireless communication modules, a power management sub-system and an embedded operating sub-system. The components of the system include, but are not limited to, these key components, which jointly constitute the core functional part of the intelligent monitoring system. The communication module includes, but is not limited to, a wireless communication channel such as LTE, Wi-Fi and SubG RF. The communication module is connected to the peripherals to form a self-healing functional unit of the intelligent monitoring system.

The intelligent monitoring system includes a fault detection mechanism, an integrated system and implementation method (smart vision device with health monitoring and self-healing functions), a fault diagnosis mechanism, a self-healing mechanism and an interactive interface. The fault detection mechanism is configured to monitor the key indicators of the device status in real time, and identify the abnormal operation data in combination with the time-series analysis. The fault diagnosis mechanism is configured to parse system logs and device status information, identify fault characteristics and classify fault types. The self-healing mechanism is configured to start fault handling application service, and adapt different recovery processes according to different faults. The interactive interface is configured to report a fault and healing status thereof to the user and the monitoring backend.

Figure 10:
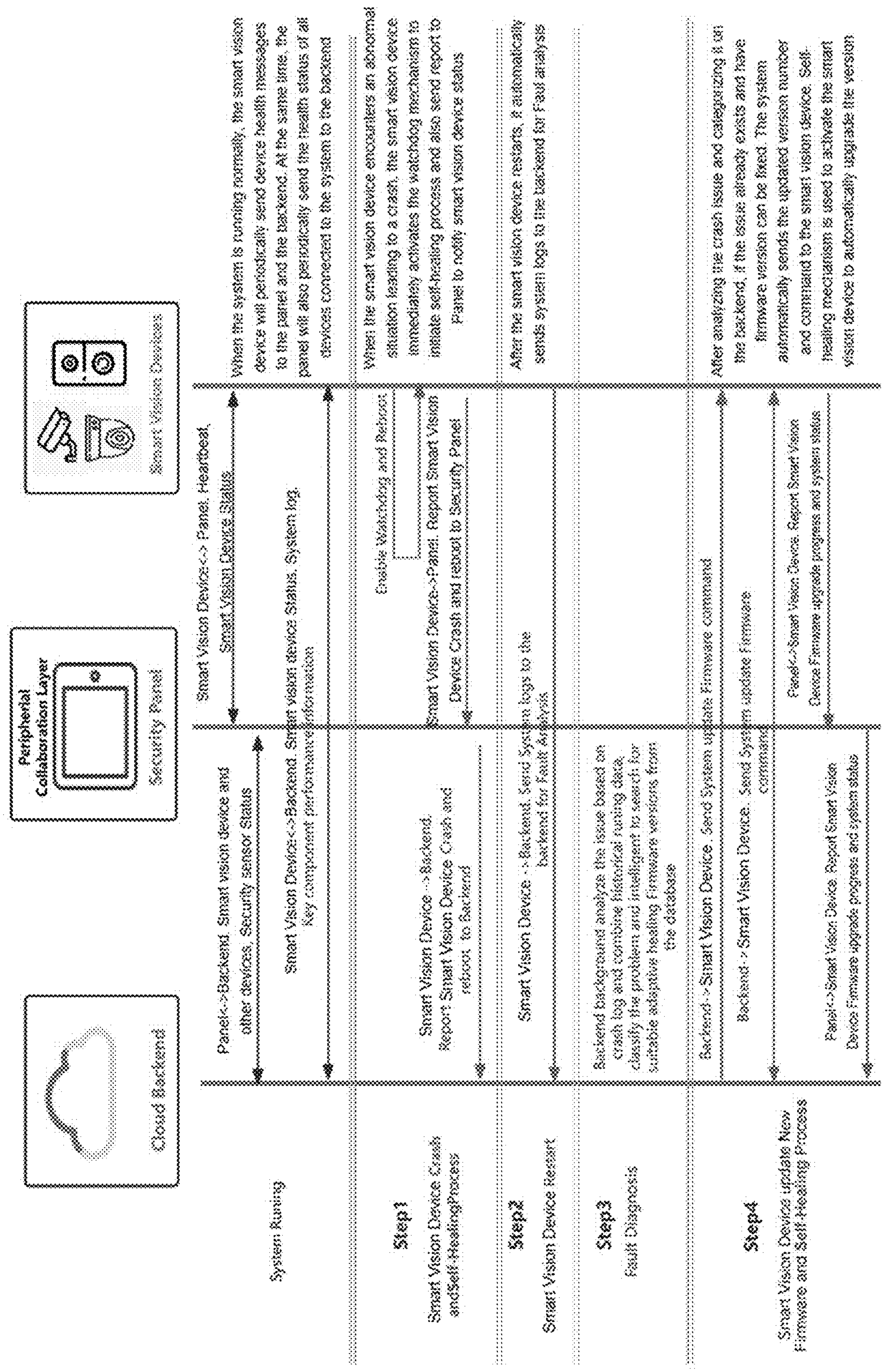
FIG. 10 is a flow chart of performing self-healing after the smart vision device crashes in accordance with an embodiment of the present disclosure.
Figure 11:
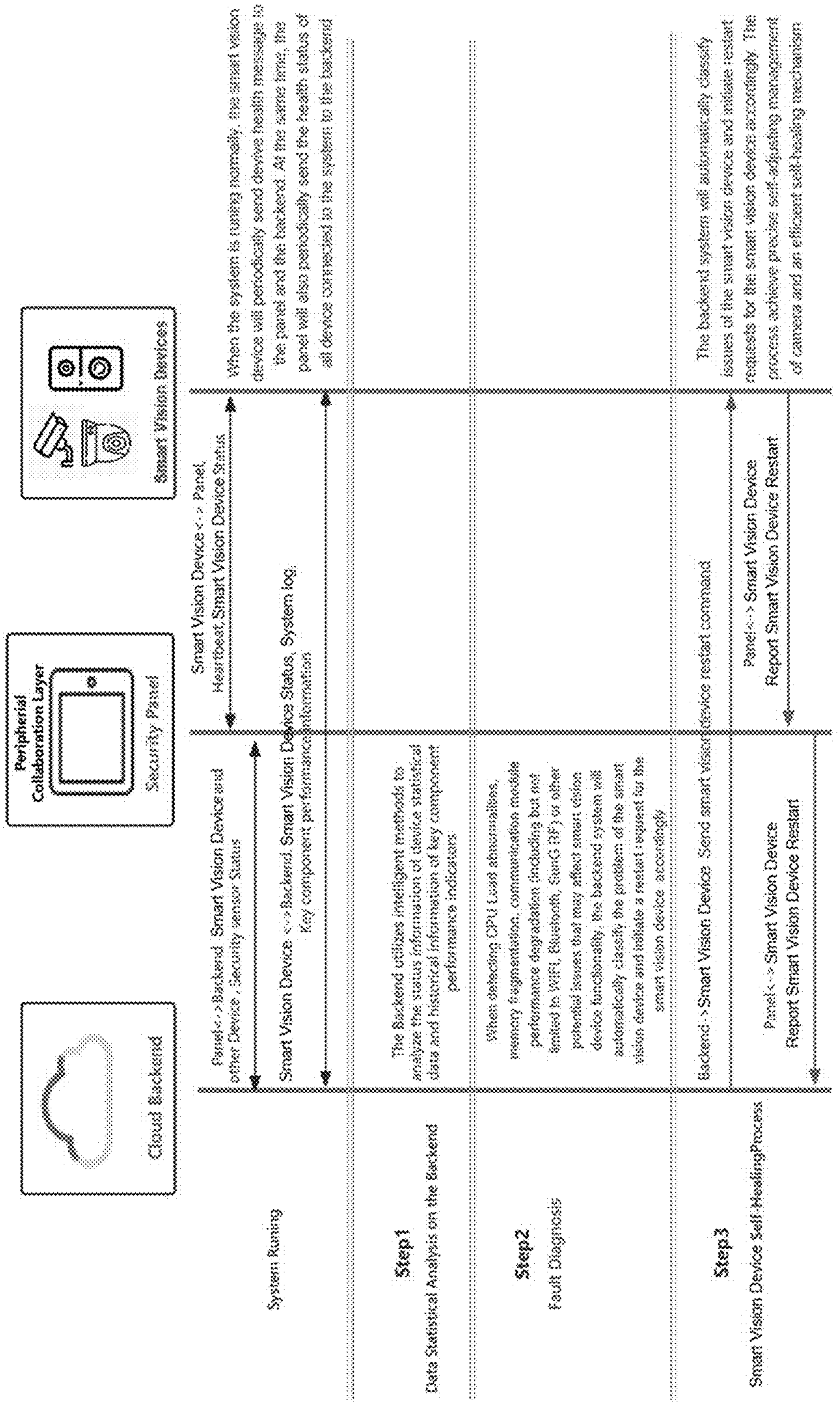
FIG. 11 is a flow chart of performing health monitoring and self-healing in accordance with an embodiment of the present disclosure.
Figure 12:
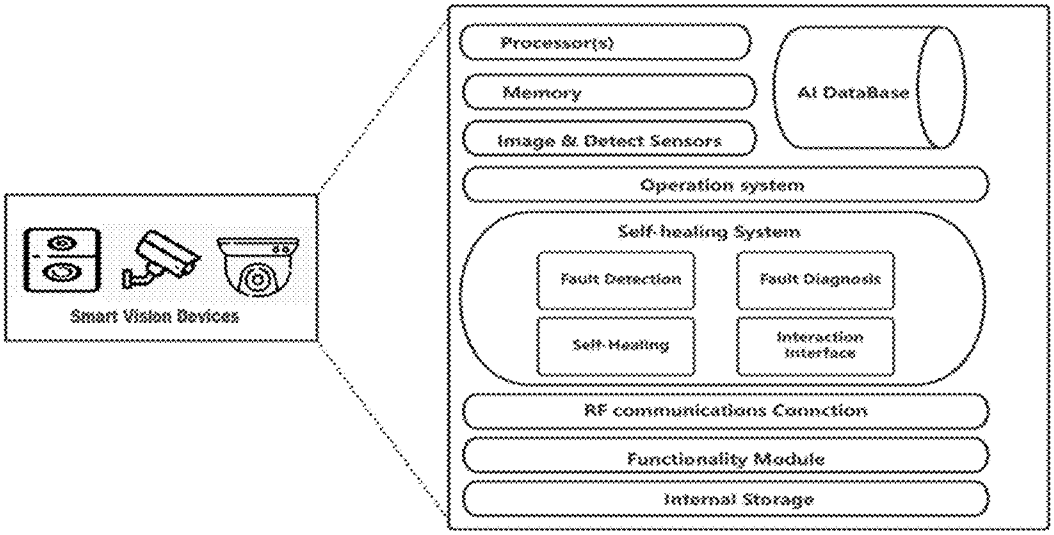
FIG. 12 is a schematic diagram of edge devices of the smart vision device in accordance with an embodiment of the present disclosure.
Figure 13:
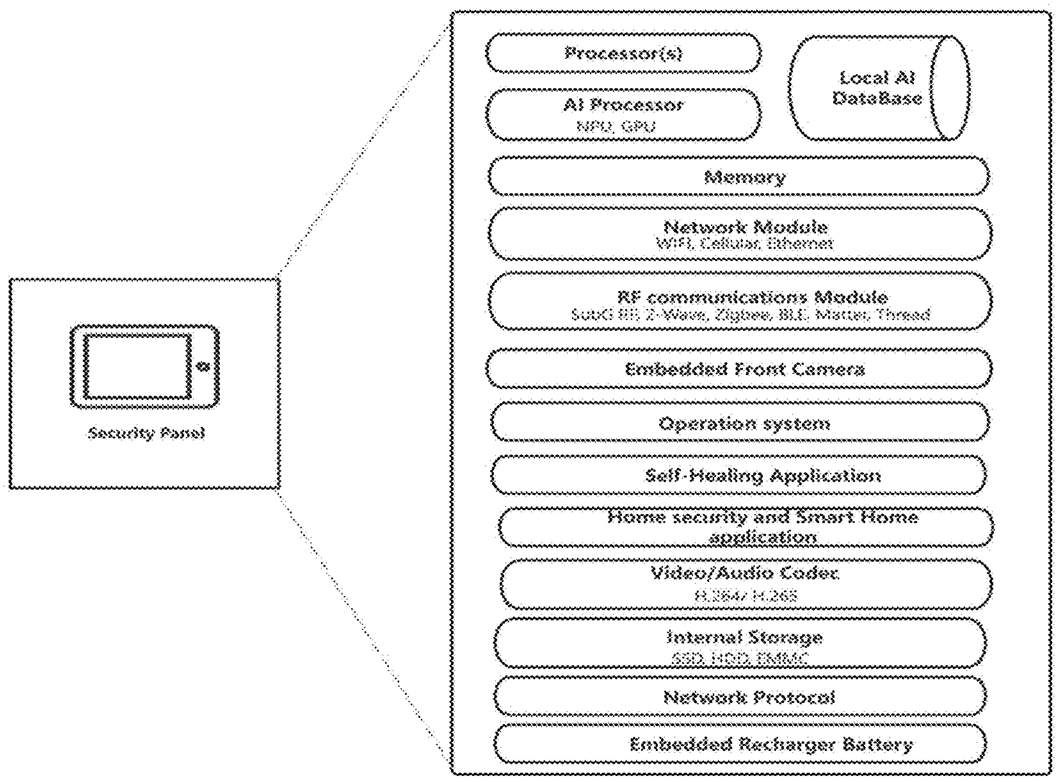
FIG. 13 is a schematic diagram of edge devices of a security panel in accordance with an embodiment of the present disclosure.

Referring to FIGS. 10-11, the intelligent monitoring system further includes a data collection and analysis mechanism. The data collection and analysis mechanism is configured to automatically collect multi-dimensional data from the backend system, including log records, daily operation data, performance parameters of the smart vision device, operating performance of the key components and shooting environment related information. The collected data sets are deeply mined and analyzed through advanced data analysis technology, so as to identify and extract valuable information. Moreover, this mechanism can perform fault mode analysis, optimize the overall performance of the smart vision device by using data insights, or provide a customized self-healing suggestion based on individual differences.

By virtue of such framework, the intelligent monitoring system integrates intelligent backend data analysis to assist diagnosis, thereby achieving comprehensive self-healing capability without human intervention.

In an embodiment, a self-healing method of a smart vision device is provided, including the following steps. Log records, daily operation data, performance parameters of the smart vision device, and operating efficiency data of the key components are transmitted from the intelligent monitoring system to the cloud server. The received information is then preliminarily analyzed using a data analysis engine to determine a type and scope of a potential fault. A fault knowledge database is accessed to compare the preliminary analysis results with data stored in the fault knowledge database, and a known fault case and corresponding healing solution that match the fault information are identified. A healing instruction is generated based on the identified healing solution, and is transmitted to the self-healing module of the intelligent monitoring system for execution. After performing the healing operation, a feedback is transmitted from the self-healing module to the cloud server. A healing effectiveness is verified, and the fault knowledge database is accordingly updated. The intelligent monitoring system further includes a backend data analysis module, which includes a machine learning model. The backend data analysis module is configured to train the machine learning model based on historical fault data and healing results, thereby improving the accuracy of fault detection and the generation efficiency of the healing solution. After verifying the healing effectiveness, if the healing is successful, the current fault case and the healing solution thereof are added to the fault knowledge database for enrichment. If the healing failure occurs or the fault cannot be resolved at present, the training parameters of the machine learning model are adjusted according to the cause of the fault, and the incidence of the related problem is counted to form a problem ticket. This is intended to enhance the model's ability to automatically update software after future healing.

Figure 14:
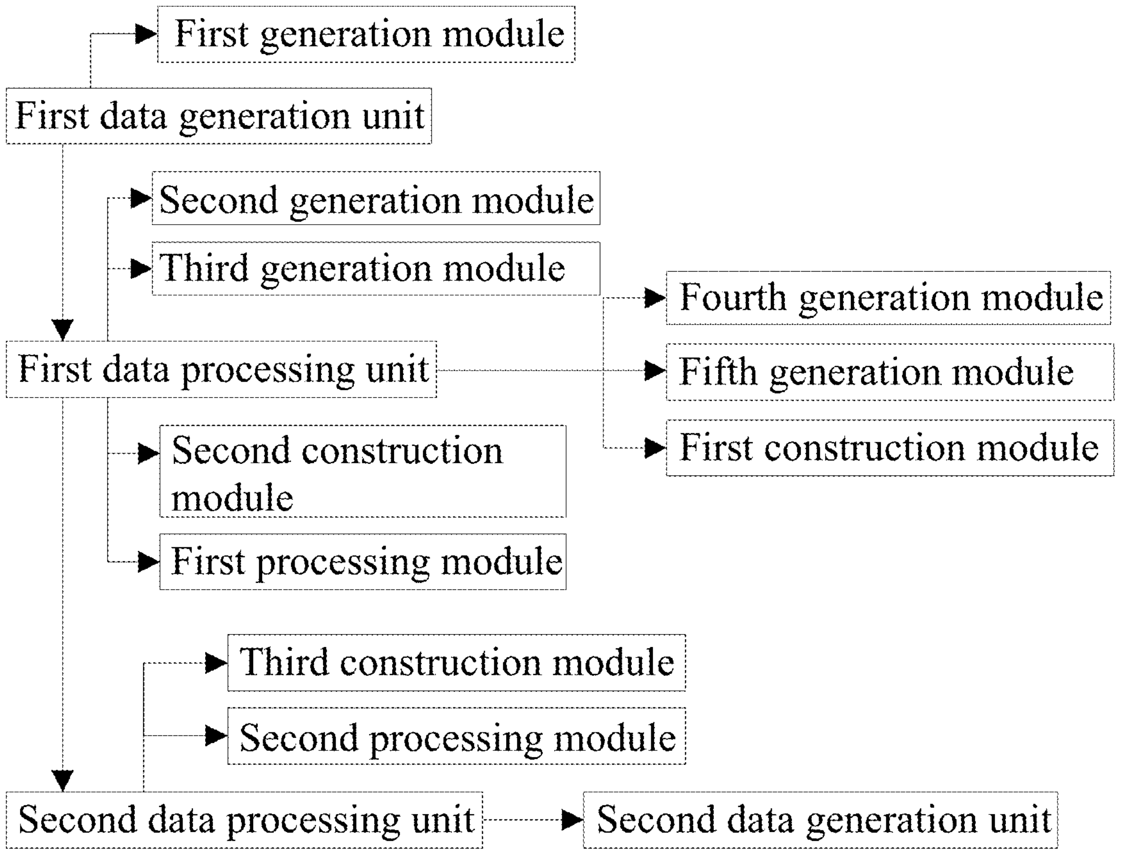
FIG. 14 is a schematic diagram of a system for autonomous fault detection, identification and healing of the smart vision device in accordance with an embodiment of the present disclosure.
Figure 15:
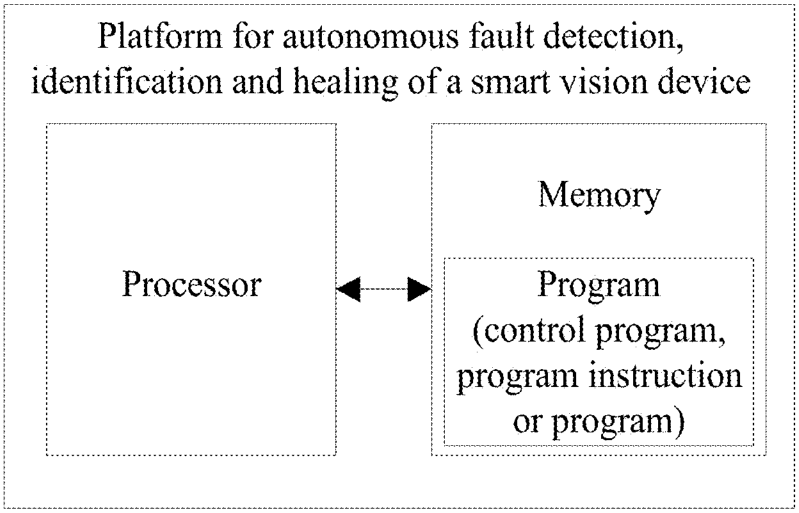
FIG. 15 is a schematic diagram of a platform for autonomous fault detection, identification and healing of the smart vision device in accordance with an embodiment of the present disclosure.

In order to achieve the above object, the present disclosure also provides a system for implementing the method for autonomous fault detection, identification and healing of the smart vision device. As shown in FIG. 14, the system includes a first data generation unit, a first data processing unit and a second data processing unit.

The first data generation unit is configured to generate and acquire the first data corresponding to the smart vision device in real time. The first data is operation status data of components of the smart vision device.

The first data processing unit is configured to process the first data through time-series analysis to generate the second data corresponding to the first data. The second data is abnormal data in the operation status data.

The second data processing unit is configured to construct the self-healing mechanism corresponding to the smart vision device and autonomously heal the smart vision device in real time based on the self-healing mechanism and the fault type of the second data.

The system further includes a second data generation unit. The second data generation unit is configured to generate and acquire the third data corresponding to the smart vision device, and transmit the third data in real time. The third data includes fault diagnosis result data and self-healing status data of the smart vision device.

The first data includes hardware operating parameter data, communication status data and environmental index data corresponding to the smart vision device. The first data generation unit includes a first generation module, which is configured to separately generate and acquire the hardware operating parameter data, the communication status data and the environmental index data. The components of the smart vision device include an image sensor, a processor, a memory and a power supply. The hardware operating parameter data includes signal-to-noise ratio data of the image sensor, a wireless transmission operating status of the smart vision device, operation interaction information of the smart vision device, temperature data of the processor, load rate data of the processor, occupancy rate data of the memory, fragmentation degree data of the memory, a voltage fluctuation value of the power supply, a battery health level of the power supply and battery temperature data of the power supply.

The first data processing unit includes a second generation module and a third generation module.

The second generation module is configured to generate a third data corresponding to the first data based on data statistical analysis and data mining. The third data is a change rate of key monitoring indicators related to operation status of the smart vision device in a preset monitoring period.

The third generation module is configured to generate and acquire at least two sets of threshold data corresponding to the operation status data, and generate the second data according to the at least two sets of threshold data and the third data.

The first data processing unit further includes a fourth generation module, a fifth generation module and a first construction module.

The fourth generation module is configured to generate and acquire a fourth data corresponding to the smart vision device. The fourth data is historical fault log data and healing result data corresponding to the historical fault log data.

The fifth generation module is configured to sequentially perform extraction and parsing on the fourth data to generate fifth data corresponding to the fourth data. The fifth data comprises time-domain feature data and frequency-domain feature data.

The first construction module is configured to construct a fault feature database corresponding to the smart vision device based on the fifth data.

The first data processing unit further includes a second construction module and a first processing module.

The second construction module is configured to construct a machine learning model corresponding to the second data based on a machine learning algorithm, and continuously update a weight of the machine learning model through online learning.

The first processing module is configured to process the second data by classified diagnosis to generate a sixth data corresponding to the second data based on the machine learning model in combination with the fault feature database. The sixth data is fault type data of the smart vision device.

The second data processing unit includes a third construction module and a second processing module.

The third construction module is configured to construct a mapping relationship between the self-healing mechanism and the fault type of the second data based on the fault feature database.

The second processing module is configured to perform cluster analysis on the fault type data of the smart vision device combined with the machine learning model, and optimize a matching weight of the self-healing mechanism in real time. The self-healing mechanism includes the following steps. A faulty module is switched, or a latest available configuration is restored. A backup hardware link is switched, or an operation mode is downgraded. A healing patch or a complete firmware is downloaded and installed from a cloud.

The steps of the method for autonomous fault detection, identification and healing have been described above in detail. In other words, the functional modules in the system are configured to implement the steps or sub-steps in the above embodiments related to the method, which will not be repeated herein.

An electronic platform is also provided, including a processor, a memory and a control program. The memory is configured to store the control program. The processor is configured to execute the control program to implement the steps in the method provided herein.

Specifically, the processor is configured to execute the control program to implement the following steps.

(S1) A first data corresponding to the smart vision device is generated and acquired in real time. The first data is operation status data of components of the smart vision device.

(S2) The first data is processed through time-series analysis to generate a second data corresponding to the first data. The second data is abnormal data in the operation status data.

(S3) A self-healing mechanism corresponding to the smart vision device is constructed. Based on the self-healing mechanism and a fault type of the second data, the smart vision device is autonomously healed in real time.

The specific details of the steps have been described above and will not be repeated herein.

In an embodiment, the built-in processor of the platform can be composed of an integrated circuit, which can be composed of an integrated circuit or multiple integrated circuits with the same or different functions, including one or more CPUs, microprocessors, digital processing chips, graphics processors, control chips and combinations thereof. The processor is connected to various components through various interfaces and lines, and is configured to execute various functions and process data associated with the method provided herein by running or executing programs or units stored in the memory, and calling data stored in the memory. The memory is configured to store program codes and various data, and is mounted in the platform. The memory can realize high-speed and automatic access to programs or data during operation.

The memory includes an ROM, an RAM, a programmable read-only memory (PROM), an erasable programmable read-only memory (EPROM), a one-time programmable read-only memory (OTPROM), an electronically erasable programmable read-only memory (EEPROM), or any other computer-readable medium that can be used to carry or store data.

The present disclosure provides the method for autonomous fault detection, identification and healing of a smart vision device. The first data corresponding to the smart vision device is generated and acquired in real time, where the first data is operation status data of components of the smart vision device; the first data is processed through time-series analysis to generate the second data corresponding to the first data, where the second data is abnormal data in the operation status data; the self-healing mechanism corresponding to the smart vision device is constructed; and based on the self-healing mechanism and the fault type of the second data, the smart vision device is autonomously healed in real time. The system and platform for implementing the method are also provided. The disclosure can monitor the operating status of the smart vision device in real time, comprehensively analyze the health data of the smart vision device and peripheral devices thereof. In addition, customized healing strategies are adopted for different types of faults or performance degradation, thereby enhancing the stability and reliability of the smart vision device, reducing maintenance costs, and ensuring the continuous and stable operation of the system.

In other words, the technical solution of the present disclosure can realize fully-automated processing of device anomalies by integrating multi-dimensional health monitoring, intelligent diagnosis and adaptive healing mechanisms, resulting in significantly improved reliability and stability of the device.

The embodiments disclosed above are merely illustrative of the disclosure, and are not intended to limit the present disclosure. It should be understood that any modifications, changes and replacements made by those skilled in the art without departing from the spirit of the disclosure shall fall within the scope of the disclosure defined by the appended claims.

What is claimed is:

1. A method for autonomous fault detection, identification and healing of a smart vision device, comprising:

(1) generating and acquiring a first data corresponding to the smart vision device in real time, wherein the first data is operation status data of components of the smart vision device;

(2) processing the first data through time-series analysis to generate a second data corresponding to the first data, wherein the second data is abnormal data in the operation status data; and (3) constructing a self-healing mechanism corresponding to the smart vision device; and based on the self-healing mechanism and a fault type of the second data, autonomously healing the smart vision device in real time;

wherein step (2) comprises:

(2.1) generating a third data corresponding to the first data based on data statistical analysis and data mining, wherein the third data is a change rate of key monitoring indicators related to operation status of the smart vision device in a preset monitoring period;

(2.2) generating and acquiring at least two sets of threshold data corresponding to the operation status data; and generating the second data according to the at least two sets of threshold data and the third data;

(2.3) generating and acquiring a fourth data corresponding to the smart vision device, wherein the fourth data is historical fault log data and healing result data corresponding to the historical fault log data;

(2.4) sequentially performing extraction and parsing on the fourth data to generate a fifth data corresponding to the fourth data, wherein the fifth data comprises time-domain feature data and frequency-domain feature data; and (2.5) based on the fifth data, constructing a fault feature database corresponding to the smart vision device.

2. The method of claim 1, wherein the first data comprises hardware operating parameter data, communication status data and environmental index data corresponding to the smart vision device;

the components of the smart vision device comprise an image sensor, a processor, a memory and a power supply; and step (1) comprises:

separately generating and acquiring the hardware operating parameter data, the communication status data and the environmental index data, wherein the hardware operating parameter data comprises signal-to-noise ratio data of the image sensor, a wireless transmission operating status of the smart vision device, operation interaction information of the smart vision device, temperature data of the processor, load rate data of the processor, occupancy rate data of the memory, fragmentation degree data of the memory, a voltage fluctuation value of the power supply, a battery health level of the power supply and battery temperature data of the power supply.

3. The method of claim 1, wherein the step (2) further comprises:

(2.6) based on a machine learning algorithm, constructing a machine learning model corresponding to the second data, and continuously updating a weight of the machine learning model through online learning; and (2.7) based on the machine learning model in combination with the fault feature database, processing the second data by classified diagnosis to generate a sixth data corresponding to the second data, wherein the sixth data is fault type data of the smart vision device.

4. The method of claim 3, wherein step (3) comprises:

(3.1) based on the fault feature database, constructing a mapping relationship between the self-healing mechanism and the fault type of the second data; and (3.2) combined with the machine learning model, performing cluster analysis on the fault type data of the smart vision device, and optimizing a matching weight of the self-healing mechanism in real time;

wherein the self-healing mechanism comprises:

restarting a faulty module or restoring a latest available configuration;

switching a backup hardware link or downgrading an operation mode; and downloading and installing a healing patch or a complete firmware from a cloud.

5. The method of claim 1, further comprising:

(4) after step (3), generating and acquiring a third data corresponding to the smart vision device, and transmitting the third data in real time;

wherein the third data comprises fault diagnosis result data and self-healing status data of the smart vision device.

6. A system for implementing the method of claim 1, comprising:

a first data generation unit;

a first data processing unit; and a second data processing unit;

wherein the first data generation unit is configured to generate and acquire the first data in real time;

the first data processing unit is configured to process the first data through the time-series analysis to generate the second data;

the second data processing unit is configured to construct the self-healing mechanism and autonomously heal the smart vision device in real time based on the self-healing mechanism and the fault type of the second data;

the first data processing unit comprises a second generation module, a third generation module, a fourth generation module, a fifth generation module and a first construction module;

the second generation module is configured to generate a third data corresponding to the first data based on data statistical analysis and data mining; and the third data is a change rate of key monitoring indicators related to operation status of the smart vision device in a preset monitoring period;

the third generation module is configured to generate and acquire at least two sets of threshold data corresponding to the operation status data, and generate the second data according to the at least two sets of threshold data and the third data;

the fourth generation module is configured to generate and acquire a fourth data corresponding to the smart vision device; and the fourth data is historical fault log data and healing result data corresponding to the historical fault log data;

the fifth generation module is configured to sequentially perform extraction and parsing on the fourth data to generate fifth data corresponding to the fourth data; and the fifth data comprises time-domain feature data and frequency-domain feature data; and the first construction module is configured to construct a fault feature database corresponding to the smart vision device based on the fifth data.

7. The system of claim 6, wherein the first data comprises hardware operating parameter data, communication status data and environmental index data corresponding to the smart vision device;

the components of the smart vision device comprise an image sensor, a processor, a memory and a power supply;

the first data generation unit comprises a first generation module; and the first generation module is configured to separately generate and acquire the hardware operating parameter data, the communication status data and the environmental index data; and the hardware operating parameter data comprises signal-to-noise ratio data of the image sensor, a wireless transmission operating status of the smart vision device, operation interaction information of the smart vision device, temperature data of the processor, load rate data of the processor, occupancy rate data of the memory, fragmentation degree data of the memory, a voltage fluctuation value of the power supply, a battery health level of the power supply and battery temperature data of the power supply.

8. The system of claim 1, wherein the first data processing unit further comprises a second construction module and a first processing module;

the second construction module is configured to construct a machine learning model corresponding to the second data based on a machine learning algorithm, and continuously update a weight of the machine learning model through online learning; and the first processing module is configured to process the second data by classified diagnosis to generate a sixth data corresponding to the second data based on the machine learning model in combination with the fault feature database; and the sixth data is fault type data of the smart vision device.

9. The system of claim 8, wherein the second data processing unit comprises a third construction module and a second processing module;

the third construction module is configured to construct a mapping relationship between the self-healing mechanism and the fault type of the second data based on the fault feature database;

the second processing module is configured to perform cluster analysis on the fault type data of the smart vision device combined with the machine learning model, and optimize a matching weight of the self-healing mechanism in real time; and the self-healing mechanism comprises:

restarting a faulty module or restoring a latest available configuration;

switching a backup hardware link or downgrading an operation mode; and downloading and installing a healing patch or a complete firmware from a cloud.

10. The system of claim 6, further comprising:

a second data generation unit;

wherein the second data generation unit is configured to generate and acquire a third data corresponding to the smart vision device, and transmit the third data in real time, wherein the third data comprises fault diagnosis result data and self-healing status data of the smart vision device.

11. An electronic platform, comprising:

a processor;

a memory; and a control program;

wherein the memory is configured to store the control program; and the processor is configured to execute the control program to implement the method of claim 1.

* * * * *